(12) United States Patent
Nishizawa et al.

(10) Patent No.: US 8,108,988 B2
(45) Date of Patent: Feb. 7, 2012

(54) METHOD OF MANUFACTURING A LAMINATED IRON CORE

(75) Inventors: Takeshi Nishizawa, Kitaazumi-gun (JP); Hideo Horii, Kitaazumi-gun (JP)

(73) Assignee: Kuroda Precision Instruments Ltd., Kawasaki-shi (JP)

( * ) Notice: Subject to any disclaimer, the term of this patent is extended or adjusted under 35 U.S.C. 154(b) by 781 days.

(21) Appl. No.: 12/191,150

(22) Filed: Aug. 13, 2008

(65) Prior Publication Data

US 2008/0307634 A1  Dec. 18, 2008

Related U.S. Application Data

(62) Division of application No. 11/284,618, filed on Nov. 22, 2005, now abandoned.

(30) Foreign Application Priority Data

Nov. 29, 2004  (JP) .................................. 2004-344028

(51) Int. Cl.
*H01F 3/02* (2006.01)
*H02K 15/10* (2006.01)

(52) U.S. Cl. ............... 29/609; 29/596; 29/33 L; 29/738; 29/564.6; 310/216.004; 310/216.011

(58) Field of Classification Search ..................... 29/596, 29/598, 609, 33 L, 736, 738, 564.6; 310/216.004, 310/216.011, 261.1
See application file for complete search history.

(56) References Cited

U.S. PATENT DOCUMENTS

| | | | |
|---|---|---|---|
| 3,553,622 A * | 1/1971 | Subovici | ..................... 29/609 X |
| 3,659,129 A | 4/1972 | Pettersen | |
| 3,882,336 A | 5/1975 | Boyd et al. | |
| 4,578,853 A | 4/1986 | Wuirth | |
| 5,163,217 A | 11/1992 | Sakanishi | |
| 5,477,096 A | 12/1995 | Sakashita et al. | |
| 5,799,387 A | 9/1998 | Neuenschwander et al. | |
| 5,829,120 A | 11/1998 | Uchida et al. | |
| 6,009,607 A * | 1/2000 | Bertocchi et al. | ........ 29/564.6 X |
| 7,168,158 B2 | 1/2007 | Shirai et al. | |
| 7,562,439 B2 | 7/2009 | Yamamoto et al. | |
| 2002/0130582 A1 | 9/2002 | Oketani et al. | |
| 2006/0119209 A1 | 6/2006 | Nishizawa et al. | |
| 2009/0038146 A1 | 2/2009 | Nishizawa et al. | |

FOREIGN PATENT DOCUMENTS

| | | | | |
|---|---|---|---|---|
| JP | 55162840 | * | 12/1980 | ..................... 29/596 |
| JP | 4-331444 A | | 11/1992 | |
| JP | 5-38106 A | | 2/1993 | |
| JP | 6-141516 A | | 5/1994 | |
| JP | 8-250320 A | | 9/1996 | |

OTHER PUBLICATIONS

Final Office Action dated Apr. 28, 2009, issued in U.S. Appl. No. 11/284,618. Non-final Office Action dated Apr. 14, 2010 issued by the USPTO in related U.S. Appl. No. 12/247,791.

* cited by examiner

*Primary Examiner* — A. Dexter Tugbang
(74) *Attorney, Agent, or Firm* — Holtz, Holtz, Goodman & Chick, PC

(57) ABSTRACT

A method of manufacturing a laminated iron core using a die, includes punching out iron core pieces from a thin steel sheet material by a first working row, each piece having a spindle hole and a plurality of slot holes of a given configuration. Electrically insulating sheet pieces are punched out from an electrically insulating thin sheet material by a second working row, each piece having a spindle hole and a plurality of slot holes with a configuration similar to, but smaller than, the slot holes of the iron core pieces. Thereafter, the iron core pieces and electrically insulating sheet pieces are stacked such that edges of the slot holes of the electrically insulating sheet pieces extend outwardly beyond edges of the slot holes of the iron core pieces.

2 Claims, 5 Drawing Sheets

METHOD OF MANUFACTURING A LAMINATED IRON CORE

CROSS REFERENCE TO RELATED APPLICATION

The present application is a Divisional Application of U.S. application Ser. No. 11/284,618 filed Nov. 22, 2005 now abandoned, which is incorporated herein by reference.

TECHNICAL FIELD

The present invention relates to a laminated iron core for a motor comprising a stack of a plurality of iron core pieces each having slot holes for receiving coil windings. The present invention also relates to a method of manufacturing such a laminated iron core, and also relates to a mold for use in such a method.

TECHNICAL BACKGROUND

Iron core pieces for use in a motor core are generally formed by a successively transferring die or mold, in which core pieces are punched out by means of a punch into a die. Therefore, burrs are produced along punched edges, and particularly burrs are generated along edges of slot holes. When a coil is wound into the slot holes, coil windings are liable to be injured by these burrs.

In order to avoid such disadvantage, in Japanese Patent Laid-open Publications 4-331444, 5-38106 and 6-141516, there have been proposed several methods for removing burrs. In a Japanese Patent Laid-open Publication 8-250320, there has been proposed a method for removing burrs, in which burrs are mutually pushed down by punching out iron core pieces in a direction opposite to a usual punching out direction. Furthermore, there has been proposed another method, in which burrs are removed by a barrel finishing after stacking a plurality of punched out iron core pieces.

In the above mentioned known methods, burrs are removed or pushed down such that coil windings are not injured by burrs. However, such methods require additional processes such as the barrel finishing and insulating treatment, and therefore the production of the laminated iron core is complicated and gives low cost performance.

Moreover, in the known methods, after removing burrs, an electrically insulating material serving as an adhesive agent has to be applied or coated on surfaces of the iron core pieces. This makes the methods much more complicated.

The present invention has for its object to provide a laminated iron core, in which the influence of burrs can be removed or mitigated without requiring a complicated addition process and a coil can be wound easily and safely.

It is another object of the present invention to provide a method and a progressive die machine for manufacturing such a laminated iron core.

DISCLOSURE OF THE INVENTION

According to the invention, a laminated iron core comprises a plurality of iron core pieces formed by punching a thin steel sheet material in a downward direction and stacked into a stacking die, each of said plurality of iron core pieces including a spindle hole for receiving a spindle and a plurality of slot holes for receiving coil windings; and at least one electrically insulating sheet piece provided on an outer surface of a lowermost iron core piece, said electrically insulating sheet piece including a spindle hole and a plurality of slot holes which have a substantially similar configuration to said slot holes of the iron core piece but have a smaller size than said slot holes of the iron core pieces such that edges of the slot holes of the electrically insulating sheet piece extend outwardly beyond edges of the slot holes of the iron core pieces.

According to further aspect of the invention, a laminated iron core comprises a plurality of iron core pieces formed by punching a thin steel sheet material in a downward direction and stacked into a stacking die, each of said plurality of iron core pieces including a spindle hole for receiving a spindle and a plurality of slot holes for receiving coil windings; two electrically insulating sheet pieces provided on respective outer surfaces of uppermost and lowermost iron core pieces; and at least one electrically insulating sheet piece provided between stacks of a given number of iron core pieces; whereby each of said electrically insulating sheet pieces includes a spindle hole and a plurality of slot holes which have a substantially similar configuration to said slot holes of the iron core piece but have a smaller size than said slot holes of the iron core pieces such that edges of the slot holes of the electrically insulating sheet pieces extend outwardly beyond edges of the slot holes of the iron core pieces.

According to the invention, a method of manufacturing a laminated iron core by using progressive die or compound blanking die, comprises an iron core punching out process for punching out iron core pieces from a thin steel sheet material by means of a first working row, each of said iron core pieces having a spindle hole and a plurality of slot holes of a given configuration; an insulating sheet punching out process for punching out electrically insulating sheet pieces from an electrically insulating thin sheet material by means of a second working row, each of said electrically insulating sheet pieces including a spindle hole and a plurality of slot holes which have a substantially similar configuration to said slot holes of the iron core piece but have a smaller size than said slot holes of the iron core pieces; and a stacking process for stacking said iron core pieces and electrically insulating sheet pieces such that edges of the slot holes of the electrically insulating sheet piece extend outwardly beyond edges of the slot holes of the iron core pieces.

According to the present invention, a die machine for manufacturing a laminated iron core comprises a first working row for punching out iron core pieces having a given configuration from a thin steel sheet material, each of said iron core pieces including a spindle hole and a plurality of slot holes; a second working row for punching out electrically insulating sheet pieces from an electrically insulating thin sheet material, each of said electrically insulating sheet pieces including a spindle hole and a plurality of slot holes which have a substantially similar configuration to said slot holes of the iron core pieces but have a smaller size than said slot holes of the iron core pieces; and a stacking die mold arranged movably between said first and second working rows for selectively receiving said iron core pieces and electrically insulating sheet pieces such that successive stacks of a given number of iron core pieces are sandwiched between said electrically insulating sheet pieces.

According to the present invention, since the electrically insulating sheet piece includes the slot holes having a substantially similar configuration to said slot holes of the iron core piece but having a smaller size than said slot holes of the iron core pieces, when an electrically insulating sheet piece is provided on an outer surface of the lowermost iron core piece or two electrically sheet pieces are provided on outer surfaces of the lowermost and uppermost iron core pieces or more than two electrically insulating sheet pieces are provided between successive stacks of a given number of iron core pieces, the edges of the slot holes of the electrically insulating sheet pieces extend outwardly beyond edges of the slot holes of the iron core pieces. Therefore, upon winding a coil into the slot holes of the iron core pieces, the edges of the slot holes of the electrically Insulating sheet pieces are bent inwardly by means of coil windings such that any burrs formed along the edges of the slot holes of the iron core pieces are covered with the outwardly extended edges of the slot holes of the electrically insulating sheet pieces. Then, the coil windings are no more directly brought into contact with the burrs and can be protected against the burrs. In this manner, the coil winding operation can be performed positively and safely.

Moreover, when one or more electrically insulating sheet pieces are interposed between successive stacks of a given number of the iron core pieces, the electrical insulation between successive iron core pieces can be enhanced. Then, the electrical property of the laminated iron core can be improved.

BEST MODE OF THE INVENTION

Figure 1:
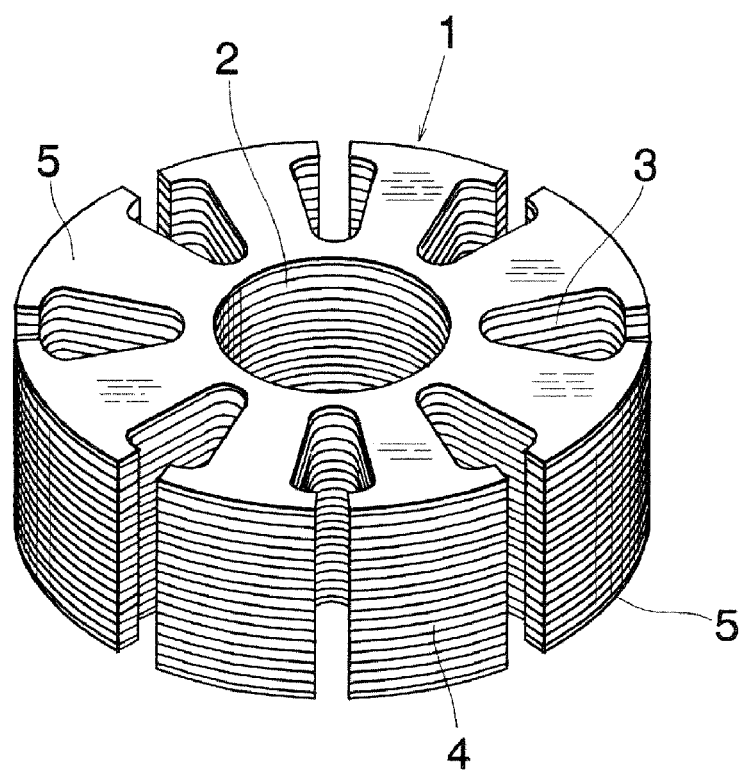
FIG. 1 is a perspective view showing an embodiment of the laminated iron core according to the invention.

Now the present invention will be explained in detail with reference to the embodiments shown in the drawings.

FIG. 1 is a perspective view showing a first embodiment of the laminated iron core according to the present invention. A laminated iron core 1 includes a stack of a plurality of iron core pieces 4 each having a spindle hole 2 formed at a center and a plurality of slot holes 3 for receiving coil windings. The slot holes 3 are of an open slot type and the laminated iron core 1 has a substantially tubular configuration as a whole. The laminated iron core 1 further comprises electrically insulating sheet pieces 5 stacked together with the iron core pieces 4 to form the laminated iron core 1.

Figure 2:
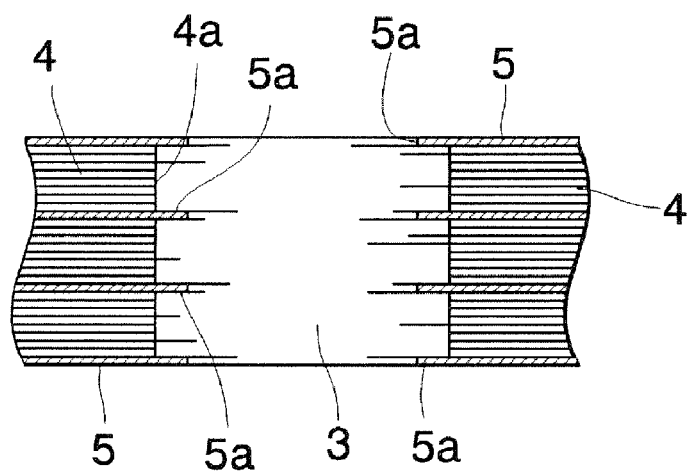
FIG. 2 is a cross sectional view of a slot hole portion of the laminated iron core shown in FIG. 1.

FIG. 2 is a cross sectional view of the laminated iron core of the present embodiment. As illustrated in FIG. 2, in the present embodiment, two electrically insulating sheet pieces 5 are provided on respective outer surfaces of the lowermost and uppermost iron core pieces 4 and two electrically insulating sheet pieces 5 are provided between successive stacks of eight iron core pieces 4. Each of the electrically insulating sheet pieces 5 has formed therein a plurality of slot holes 5a having a similar configuration to that of slot holes 4a formed in the iron core pieces 4, but the slot holes 5a of the electrically insulating sheet piece 5 are slightly smaller than the slot holes 4a of the iron core pieces 4. Therefore, edges of the slot holes 5a of the electrically insulating sheet pieces 5 extend beyond edges of the slot holes 4a of the iron core pieces 4.

Therefore, when a coil is wound into the slot holes 4a of the iron core pieces 4, the outwardly extended edges of the electrically insulating sheet pieces 5 are bent such that undesired burrs formed along the edges of the slot holes 4a of the iron core pieces 4 are covered with the edges of electrically insulating sheet pieces 5. In this manner, the coil can be wound into the slot holes 4a of the iron core pieces 4 safely without injuring the coil, and therefore the coil can be effectively prevented from being broken during a usage.

According to the invention, it is also possible to provide electrically insulating sheet pieces 5 such that each of the iron core pieces 4 is sandwiched between electrically insulating sheet pieces 5. Then, isolation of the iron core pieces 4 is enhanced and the electrical property of the laminated iron core 1 can be further improved. Moreover, the electrically insulating sheet pieces 5 may be arranged in various manners. For instance, electrically insulating sheet pieces 5 may be provided on outer surfaces of the lowermost and uppermost iron core pieces as well as between first and second stacks of iron core pieces each consisting of a half number of total iron core pieces or between first and second stacks and second and third stacks each consisting of a third of total iron core pieces.

Figure 3:
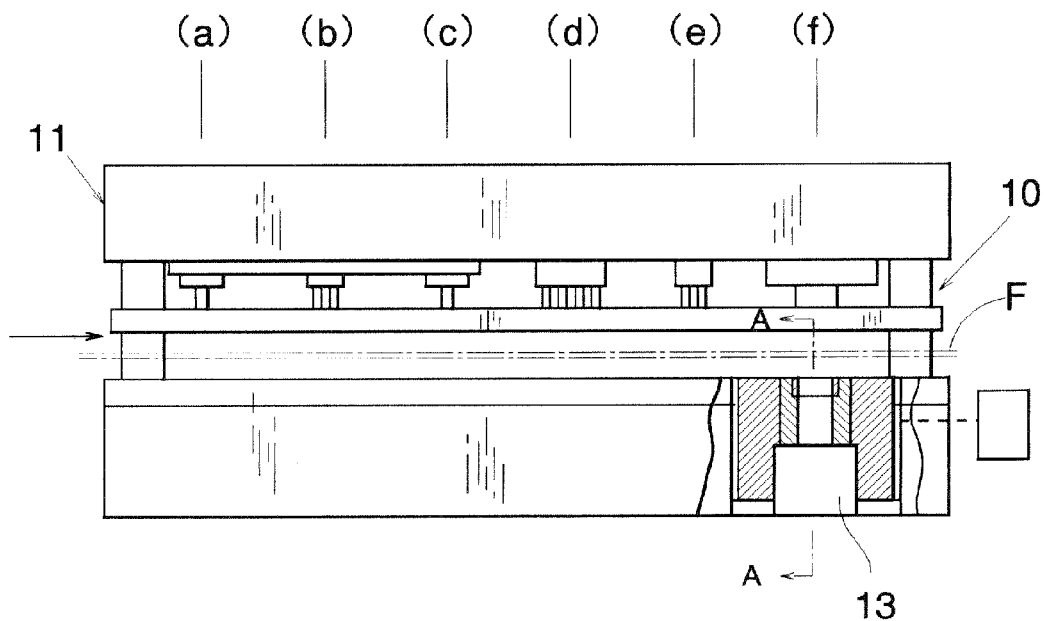
FIG. 3 is a side view illustrating a first embodiment of the die machine according to the invention.
Figure 4:
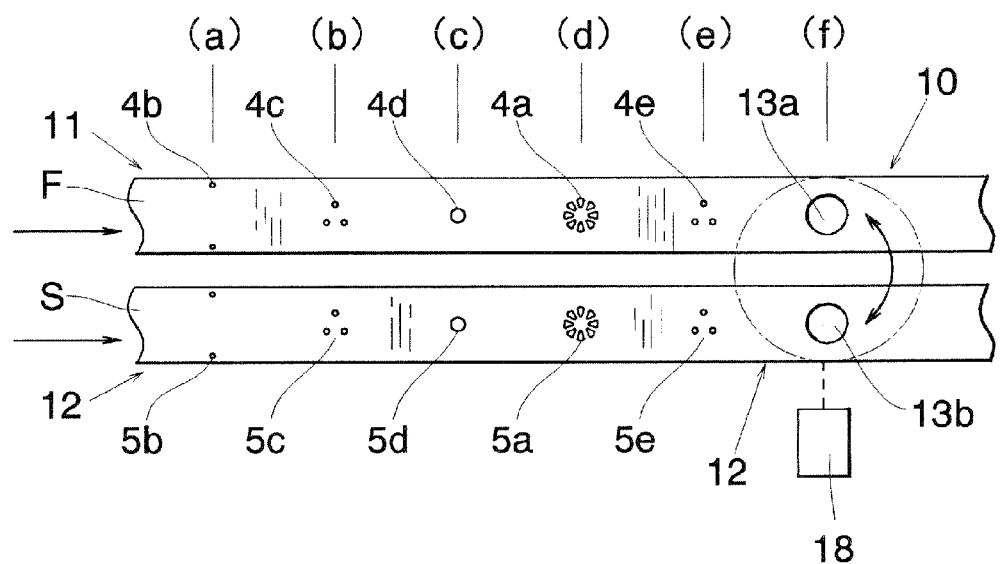
FIG. 4 is a plan view of the die machine shown in FIG. 3.

FIGS. 3 and 4 are a side view and a plan view, respectively showing an embodiment of the progressive die machine according to the present invention for manufacturing the laminated iron core according to the invention. The progressive die machine 10 comprises first and second working rows 11 and 12 extending parallelly in a longitudinal direction, while these working rows being separated from each other by a given distance. The first working row 11 serves to form iron core pieces 4 having a thickness of, for instance 0.5 mm from an elongated hoop material F made of electromagnetic steel plate. The second working row 12 serves to form electrically insulating sheet pieces 5 from a synthetic resin sheet S such as a polycarbonate sheet having a thickness of, for instance 0.02 mm. The second working row 12 is constructed to form the electrically insulating sheet pieces 5 having a substantially similar configuration to the iron core pieces 4 except for a size of the slot holes.

In FIGS. 3 and 4, (a)-(f) denote successive process steps for forming the iron core pieces 4 and electrically insulating sheet pieces 5. A step (a) is provided to form pilot holes 4b and 5b in the hoop material F and synthetic resin sheet S, respectively, a step (b) to form clamping holes 4c and 5c for coupling the iron core pieces 4 and electrically insulating sheet pieces 5, a step (c) to form the spindle holes 4d and 5d, a step (d) to form the slot holes 4a and 5a, a step (e) to form clamping projections and depressions 4e and 5e, and a step (f) is arranged to punch out the iron core pieces 4 and electrically insulating sheet pieces 5a from the hoop material F and synthetic resin sheet S, respectively.

The elongated hoop material F for forming the iron core pieces 4 is fed intermittently by a given length, and at the step (a), the pilot holes 4b for positioning the hoop material F at given positions are formed in the hoop material F. In the step (b) a plurality of coupling through holes 4c are formed in a portion of the hoop material F corresponding to a first iron core piece among a plurality of iron core pieces consisting of the laminated iron core. In the step (c), the spindle hole 4d is formed by punching. In the step (d), the slot holes 4a are formed by punching. In the step (e), a plurality of the coupling projections and depressions 4e are formed in a portion of the hoop material F corresponding to iron core pieces except for said first iron core piece, said coupling projections and depressions 4e are formed at positions corresponding to the coupling through holes 4c. At the step (f), the iron core pieces 4 are punched out of the hoop material F into stacking dies 13 such that successively punched out iron core pieces 4 are clamped together by means of the coupling projections and depression 4e.

It should be noted that in the second working row 12, the synthetic resin sheet S is treated in a similar manner to that explained above with reference to the first working row 11.

Figure 5:
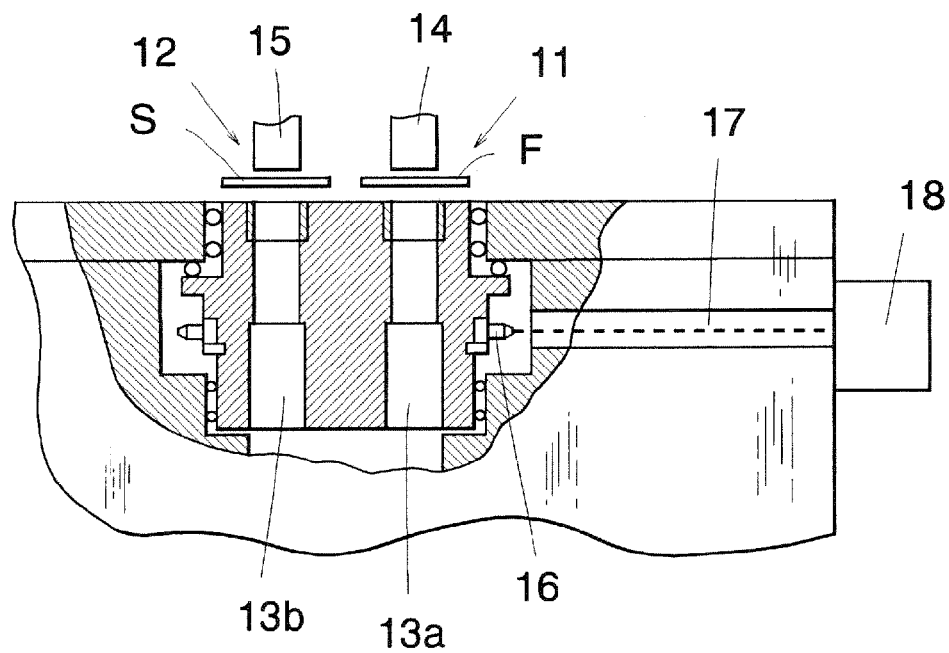
FIG. 5 is a cross sectional view cut along a line A-A in FIG. 3.

In the present embodiment, in the step (f), the iron core pieces 4 and electrically insulating sheet pieces 5 are punched into the two stacking dies 13a and 13b which are arranged rotatably over 180° as depicted in FIG. 5 such that the stacking dies 13 are selectively aligned with a punch 14 for punching out the iron core pieces 4 and a punch 15 for punching out the electrically insulating sheet pieces 5. To this end, a gear 16 is formed on a periphery of a mold of the first and second stacking dies 13a and 13b and a chain or timing belt 17 is wound around the gear 16 and a driving unit 18 such as a motor 18. According to the invention, the first and second stacking dies 13a and 13b may be rotated over 180° by means of another driving mechanism. For instance, the mold of the stacking dies 13a and 13b may be rotated in synchronism with up and down movement of a press ram not shown while interposing an index unit.

In the present embodiment, at first the first stacking die 13a is aligned with the punch 15 in the second wording row 12 and the punch 15 is operated in synchronism with the intermittent movement of the synthetic resin sheet S to punch out the lowermost electrically insulating sheet piece 5 into the first stacking die 13a. Then, the stacking die mold is rotated over 180° such that the first stacking die 13a is aligned with the punch 14 in the first working row 11 and the punch 14 is operated repeatedly to punch out a given number of iron core pieces 4 into the first stacking die 13a while operating the punch 14 in synchronism with the intermittent transportation of the hoop material F. In this condition, the second stacking die 13b is aligned with the punch 15 in the second working row 12 and the punch 15 is operated to punch out an electrically insulating sheet piece 5 in the second stacking die 13b. After that, the mold of the stacking dies 13a and 13b is rotated again over 180° and the first stacking die 13a is aligned with the punch 15 in the second working row 12. Then, the punch 15 is operated to punch out the first intermediate electrically insulating sheet piece 5 into the first stacking die 13a such that the electrically insulating sheet piece 5 is placed on a stack of iron core pieces. In this manner, a stack of iron core pieces 4 within the first stacking die 13a is sandwiched between two electrically insulating sheet pieces 5. At the same time, the punch 14 in the first working row 11 is operated by a given number of times to punch out a given number of iron core pieces 4 into the second stacking die 13b. Next, the stacking die mold is rotated again over 180° such that the first and second stacking dies 13a and 13b are aligned with the punch 14 in the first working row 11 and the punch 15 in the second working row 12, respectively. Then, the punch 14 is operated repeatedly in synchronism with the intermittent movement of the hoop material F to punch out a given number of iron core pieces 4 into the first stacking die 13a, and at the same time the punch 15 is operated to punch out an electrically insulating sheet piece 5 into the second stacking die 13b. After that, the mold of the stacking dies 13a and 13b is rotated again over 180° and the first and second stacking dies 13a and 13b are aligned with the punch 15 in the second working row 12 and the punch 14 in the first working row 11. Then, the punch 15 is operated to punch out the second intermediate electrically insulating sheet piece 5 into the first stacking die 13a, and the punch 14 is operated repeatedly to punch out a given number of iron core pieces 4 into the second stacking die 13b. Next, the stacking die mold is rotated again over 180° such that the first and second stacking dies 13a and 13b are aligned with the punch 14 in the first working row 11 and the punch 15 in the second working row 12, and then the punch 14 is operated repeatedly in synchronism with the intermittent movement of the hoop material F to punch out a given number of iron core pieces 4 into the first stacking die 13a and the punch 15 is operated to punch out an electrically insulating sheet piece 5 into the second stacking die 13b. Then, the mold of the stacking dies 13a and 13b is rotated again over 180° and the first and second stacking dies 13a and 13b are aligned with the punch 15 in the second working row 12 and the punch 14 in the first working row 11, and the punch 15 is operated to punch out the uppermost electrically insulating sheet piece 5 into the first stacking die 13a and at the same time, the punch 14 is operated repeatedly to punch out a given number of iron core pieces 4 into the second stacking die 13b. In this manner, the laminated iron core 1 shown in FIGS. 1 and 2 is obtained within the first stacking die 13a. Finally the thus formed laminated iron core 1 is removed from a bottom of the mold of the first stacking die 13a and is fed into a next working station. By repeating the above mentioned operations, laminated iron cores 1 are successively formed within the first and second stacking dies 13a and 13b alternatively. In this manner, the laminated iron core 1 having superior property can be manufactured automatically and efficiently.

In the present embodiment, the stacked iron core pieces 4 and electrically insulating sheet pieces 5 are coupled with each other by means of the clamping. When electrically insulating sheet pieces 5 are provided on respective outer surfaces of the lowermost and uppermost iron core pieces 4, a clamping through hole 5c is formed in a first electrically insulating sheet piece 5 to be provided on an outer surface of the lowermost iron core piece. Then, this electrically insulating sheet piece serves as a measuring core, and therefore the projections and depressions 4e formed in iron core pieces 4 to be successively stacked on this electrically insulating sheet piece will serve as clamping projections. Then it is no more necessary to form the clamping through holes 4c in these iron core pieces 4.

In the present embodiment, the iron core pieces 4 are coupled with each other by means of clamping, but according to the invention it is also possible to couple these pieces by any other means. For instance, the iron core pieces 4 may be connected together by means of laser welding or cementing.

Moreover, the electrically insulating sheet piece 5 may be coupled with the iron core piece 4 may be coupled together by any means other than the above mentioned clamping. For example, these pieces may be coupled together by means of welding or cementing. In case of cementing these pieces 4 and 5 by means of cementing, they may be coupled with each other within the stacking die using a suitable dispenser for applying an adhesive agent. Moreover, they may be coupled together by heating and melting the electrically insulating sheet piece 5.

Figure 6:
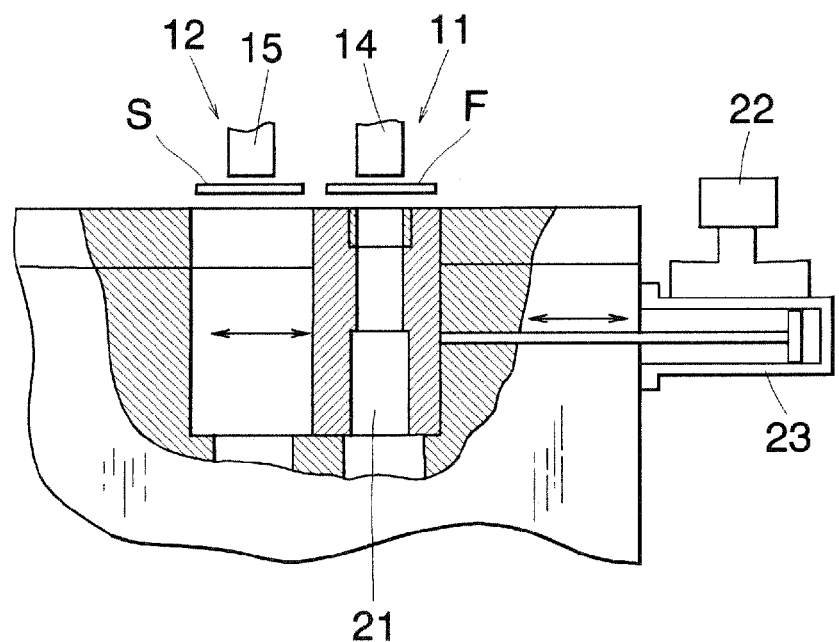
FIG. 6 is a cross sectional view showing a second embodiment of the die machine according to the invention.

FIG. 6 is a cross sectional view showing a second embodiment of the die machine according to the present invention. In the first embodiment, the stacking die mold is moved between the first and second working rows, but in the present embodiment a single stacking die 21 is moved linearly between the first and second working rows 11 and 12. That is to say, the stacking die 21 is moved between the first and second working rows 11 and 12 by means of a driving mechanism 23 including a fluid cylinder 23 controlled by a control valve 22.

Also in this embodiment, when the stacking die 21 is indexed into the first working row 11, a given number of iron core pieces 4 are punched out into the stacking die 21. Then, the stacking die 21 is moved into the second working row 12.

Figure 7:
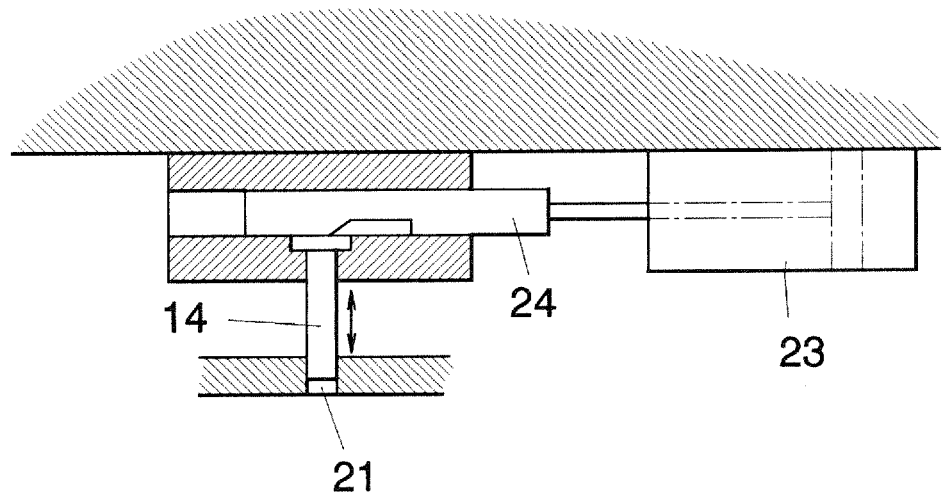
FIG. 7 is a cross sectional view depicting a punch driving mechanism.

In this case, as shown in FIG. 7, a front end of the punch 14 in the first working row 11 is retarded into a waiting position by means of a cam mechanism 25 driven by a suitable driving means 24 such as a fluid cylinder.

Then, the punch 15 is operated to punch out an electrically insulating sheet piece 5 into the stacking die 21. After that, the stacking die 21 is moved into the first working row 11.

Then, the cam mechanism 25 is driven again to move the punch 14 into the operating position. Under such a condition, the punch 14 is operated by a given number of times to punch out a given number of iron core pieces 4 into the stacking die 21. It is a matter of course that during the operation, the punch 15 in the second working row 12 is moved into a waiting position by means of a similar cam mechanism. In this manner, while the movement of the stacking die 21 between the first and second working rows 11 and 12 and the punches 14 and 15 are selectively operated to punch out a given number of iron core pieces 4 and electrically insulating sheet pieces 5 into the stacking die 21. It should be noted that the iron core punch 14 and electrically insulating sheet punch 15 may be controlled by a single common cam mechanism.

Figure 8:
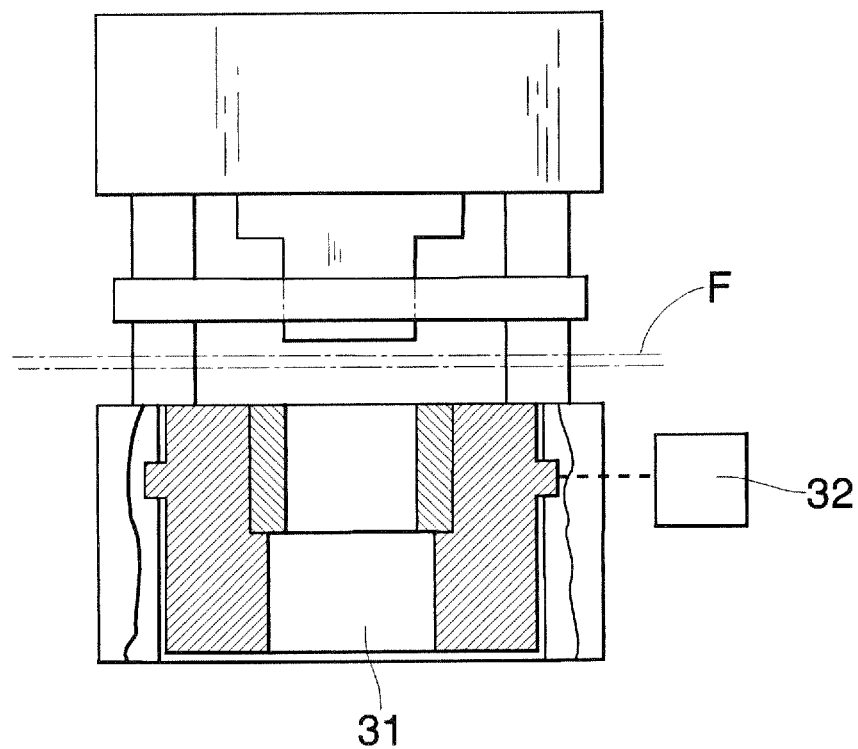
FIG. 8 is a cross sectional view showing a compound blanking die of a third embodiment of the die machine according to the invention.
Figure 9:
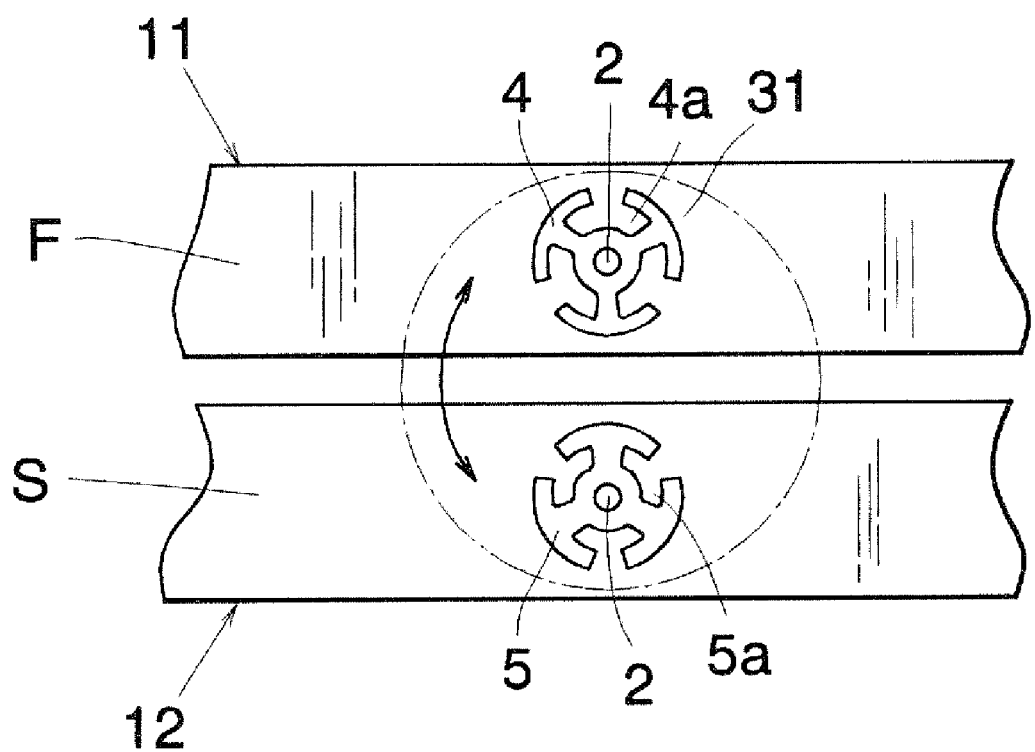
FIG. 9 is a plan view of a punching portion of the third embodiment.

FIGS. 8 and 9 illustrate a third embodiment of the die machine according to the invention. In this embodiment, a stacking die 31 for manufacturing a three pole motor core is constructed as a compound blanking die. That is to say, in the first working row 11, an iron core piece 4 including a spindle hole 2, slot holes 4a and clamping projections is formed or punched out by means of a single punch, and in the second working row 12, an electrically insulating sheet piece 5 including a spindle hole 2, slot holes 5a and clamping projections is punched by means of a single punch.

The stacking die 31 is arranged rotatably to move between the first and second working rows 11 and 12 like as the first embodiment. That is to say, when the stacking die 31 is indexed to the first working row 11, a given number of iron core pieces are punched out into the stacking die 31, and then after moving the stacking die 31 into the second working row 12, an electrically insulating sheet piece is punched out onto a stack of iron core pieces within the stacking die 31. The stacking die 31 may be moved by means of a similar mechanism to that of the first embodiment.

As described above, according to the present invention, similar advantageous effects can be attained by constructing the stacking die as the progressive die or compound blanking die. In the third embodiment depicted in FIGS. 8 and 9, the stacking die is constructed as the compound blanking die for manufacturing the three pole motor core, but according to the invention, it is also possible to form a divided type core. For instance, after forming divided iron core elements each having electrically insulating sheet pieces provided on respective outer surfaces of the lowermost and uppermost iron core pieces, these elements may be assembled into the motor core in the coil winding process. Moreover, I-shape motor core or E-shape motor core may be manufactured by the die machine according to the invention.

What is claimed is:

1. A method of manufacturing a laminated iron core by using progressive die or compound blanking die, comprising: an iron core punching out process of punching out iron core pieces from a thin steel sheet material by means of a first working row, each of said iron core pieces having a spindle hole and a plurality of slot holes of a given configuration; an insulating sheet punching out process of punching out electrically insulating sheet pieces from an electrically insulating thin sheet material by means of a second working row, each of said electrically insulating sheet pieces including a spindle hole and a plurality of slot holes which have a substantially similar configuration to said slot holes of the iron core piece but have a smaller size than said slot holes of the iron core pieces; and a stacking process of stacking said iron core pieces and electrically insulating sheet pieces such that edges of the slot holes of the electrically insulating sheet pieces extend outwardly beyond edges of the slot holes of the iron core pieces.

2. The method according to claim 1, wherein said first and second working rows are arranged parallel to each other.

\* \* \* \* \*